United States Patent
Liu et al.

(10) Patent No.: US 11,129,227 B2
(45) Date of Patent: Sep. 21, 2021

(54) DATA TRANSMISSION METHOD AND APPARATUS, AND COMPUTER STORAGE MEDIUM

(71) Applicants: CHINA MOBILE COMMUNICATION LTD., RESEARCH INSTITUTE, Beijing (CN); CHINA MOBILE COMMUNICATIONS CORPORATION, Beijing (CN)

(72) Inventors: Chao Liu, Beijing (CN); Aihua Li, Beijing (CN)

(73) Assignees: China Mobile Communication Ltd., Research Institute, Beijing (CN); China Mobile Communications Corporation, Beijing (CN)

(*) Notice: Subject to any disclaimer, the term of this patent is extended or adjusted under 35 U.S.C. 154(b) by 312 days.

(21) Appl. No.: 16/099,465

(22) PCT Filed: May 22, 2017

(86) PCT No.: PCT/CN2017/085411
§ 371 (c)(1),
(2) Date: Nov. 7, 2018

(87) PCT Pub. No.: WO2017/202270
PCT Pub. Date: Nov. 30, 2017

(65) Prior Publication Data
US 2020/0314944 A1  Oct. 1, 2020

(30) Foreign Application Priority Data
May 23, 2016 (CN) .......................... 201610346231.7

(51) Int. Cl.
*H04W 76/27* (2018.01)
*H04W 76/25* (2018.01)
(Continued)

(52) U.S. Cl.
CPC ............. *H04W 76/27* (2018.02); *H04W 8/08* (2013.01); *H04W 28/06* (2013.01); *H04W 76/25* (2018.02)

(58) Field of Classification Search
CPC ..... H04W 76/25; H04W 28/06; H04W 76/27; H04W 8/08
See application file for complete search history.

(56) References Cited

U.S. PATENT DOCUMENTS 8,817,705 B2   8/2014  Yin
9,247,471 B2   1/2016  Velev
(Continued)

FOREIGN PATENT DOCUMENTS

CN   101931898 A   12/2010
CN   102056112 A   5/2011
(Continued)

OTHER PUBLICATIONS

International Search Report in international application No. PCT/CN2017/085411, dated Aug. 11, 2017.
(Continued)

*Primary Examiner* — Syed Ali
(74) *Attorney, Agent, or Firm* — BakerHostetler

(57) ABSTRACT

The present application relates to the technical field of communications, and in particular to a data transmission method and apparatus, and a storage medium. The method comprises: when a user terminal using a control plane transmission mode is in an idle state, determining whether the user terminal needs to be converted from the control plane transmission mode to a user plane transmission mode; and if it is determined that the user terminal needs to be converted to the user plane transmission mode, initiating a service request process to a network side so as to convert same to the user plane transmission mode for data transmis-
(Continued)

sion. By means of the embodiments of the present application, when a narrow band Internet of things user using a control plane transmission mode enters an idle state, and when it is foreseen that a big data packet needs to be transmitted next, data transmission can be performed by directly converting the idle state to a user plane transmission mode, so that the conversion of a data transmission process can be reduced, thereby saving system signaling overheads, and reducing packet loss and disorder.

5 Claims, 4 Drawing Sheets

(51) Int. Cl.
*H04W 8/08* (2009.01)
*H04W 28/06* (2009.01)

(56) References Cited

U.S. PATENT DOCUMENTS

| | | | |
|---|---|---|---|
| 2002/0061764 A1* | 5/2002 | Kim | H04W 36/18 455/522 |
| 2012/0093086 A1* | 4/2012 | Yin | H04L 69/16 370/328 |
| 2014/0016614 A1 | 1/2014 | Velev | |
| 2014/0334371 A1 | 11/2014 | Kim et al. | |
| 2015/0358954 A1 | 12/2015 | Koshimizu et al. | |
| 2016/0127968 A1 | 5/2016 | Velev et al. | |
| 2016/0360479 A1 | 12/2016 | Kim et al. | |
| 2017/0332431 A1* | 11/2017 | Kim | H04W 72/048 |
| 2018/0139671 A1 | 5/2018 | Velev et al. | |
| 2019/0021130 A1* | 1/2019 | Kim | H04W 76/20 |
| 2019/0141563 A1* | 5/2019 | Ianev | H04W 28/065 |
| 2019/0297661 A1* | 9/2019 | Lee | H04W 8/08 |
| 2019/0342726 A1* | 11/2019 | Mouquet | H04L 47/80 |
| 2019/0349858 A1* | 11/2019 | Jantzi | H04W 52/0235 |
| 2020/0359350 A1* | 11/2020 | Soliman | H04W 76/30 |

FOREIGN PATENT DOCUMENTS

| | | |
|---|---|---|
| CN | 102333293 A | 1/2012 |
| CN | 102986258 A | 3/2013 |
| EP | 2509345 A1 | 10/2012 |
| JP | 2014-510496 A | 4/2014 |
| WO | 2013025066 A2 | 2/2013 |

OTHER PUBLICATIONS

English Translation of the Written Opinion of the International Search Authority in international application No. PCT/CN2017/085411, dated Aug. 11, 2017.
Supplementary European Search Report in European application No. 17802116.8, dated Dec. 19, 2018.
3GPP, "GPPTS 23.401 VI3.6.1", 3rd Generation Partnership Project; Technical Specification Group Services and System Aspects; General Packet Radio Service (GPRS) enhancements for Evolved Universal Terrestrial Radio Access Network (E UTRAN) access (Release 13), Mar. 31, 2016 (Mar. 31, 2016), pp. 156-176.
China Mobile et al: "Support for UP optimisation from CP optimisation in ECM-IDLE state", 3GPP DRAFT; S2-162438 support for up optimisation from CP optimisation in ECM-IDLE State 3rd generation partnership project (3GPP), Mobile Competence Centre 650, Route Des Lucioles; F-06921 Sophia, vol. SA WG2, No. Nanjing, P.R. China; May 23, 2016-May 27, 2016 May 17, 2016 (May 17, 2016), XP051115964, Retrieved from the Internet: URL:http://www.3gpp.org/ftp/tsg_sa/WG2_Arch/TSGS2_115_Nanjing_China/Docs [retrieved on May 17, 2016]pp. 1 to 3, figures 5.3.4.1-1.
Ericsson: "Simultaneous support for CP and UP optimisation", 3GPP Draft; S2-162489 WAS2465-WAS S2-162058-23 401 CR Ciot Simultaneous Support CP and UP-R4, 3RD Generation Partnership Project (3GPP), Mobile Competence Centre; 650, Route Des Lucioles; F-06921 So, vol. SA WG2, No. Nanjing, P.R. China; May 23, 2016-May 27, 2016 May 17, 2016 (May 17, 2016), XP051116008, Retrieved from the Internet: URL:http://www.3gpp.org/ftp/tsg sa/WG2_Arch_TSGS2_115_Nanjing China/Docs/. [retrieved on May 17, 2016]; pp. 13-14, 17 and 18-19, 25-26, figures 5.3.4b-x-1.
Qualcomm Incorporated et al.: "Simultaneous support for CP and UP optimisation ", 3GPP Draft; S2-163058-WA5 S2-162058-23 401 CR Ciot Simultaneous Support CP and UP-R7, 3rd Generation Partnership Project (3GPP), Mobile Competence Centre; 650, Route Des Lucioles; F-06921 Sophia-Ant, vol. SA WG2, No. Nanjing, P.R. China; May 23, 2016-May 27, 2016 May 27, 2016 (May 7, 2016), XP051109800, Retrieved from the Internet: URL:http://www.3gpp.org/ftp/Meetings_3GPP_SYNC/SA2/Docs/ [retrieved on May 27, 2016 ]pp. 3, 17-27, figures 5.3.4b.3, 5.3.4b.x-1, 5.3.4b.x-1, 5.10.2-1.

* cited by examiner

DATA TRANSMISSION METHOD AND APPARATUS, AND COMPUTER STORAGE MEDIUM

CROSS-REFERENCE TO RELATED APPLICATIONS

The present application is a National Stage of International Patent Application No. PCT/CN2017/085411, filed on May 22, 2017, and claims benefit of Chinese Application No. 201610346231.7, filed on May 23, 2016, the contents of which are hereby incorporated by reference in their entirety.

TECHNICAL FIELD

The disclosure relates to the field of communications, and in particular to a method and a device for data transmission, and a storage medium.

BACKGROUND

As the most promising solution for a market of low power wide area (LPWA), narrow band internet of things (NB-IOT) can connect and manage numerous objects. NB-IOT can support connections between a large number of low-throughput and ultra-low-cost devices while providing deep indoor coverage effectively. The NB-IOT has unique advantages such as low power consumption and optimized network architecture, and can be widely used in fields such as personal consumption, industry field, public filed, home appliance field.

However, due to characteristics such as low throughput and ultra-low cost of NB-IOT user equipment (UE), the existing 3rd generation (3G) and 4th generation (4G) networks are not suitable for the NB-IOT. In the evolved packet core (EPC) network, an architecture is complex, there are many network elements and interfaces on the core network side, and end-to-end signaling is complex. Therefore, for low-speed data transmission, redundant signaling leads to inefficient transmission and increased costs of the core network and the UE. Therefore, the 3rd generation partnership project (3GPP) has proposed new technologies to meet the needs of NB-IOT. For data transmission, as illustrated in FIG. 1, two solutions are proposed at present. One solution is a control plane transmission mode (also referred to as a control plane optimization mode). In this mode, there is no need to establish an S1-U bearer and a data radio bearer (DRB). Small data packets are transmitted to a mobility management entity (MME) along with a non-access stratum (NAS) signaling, and are sent to a T6a or an S11 interface to implement control plane data transmission. The other solution is a user plane transmission mode (also referred to as a user plane mode or a user plane optimization mode). In this mode, it is required to establish the S1-U bearer and the DRB to implement the user plane data transmission.

Due to a strain on resources of the control plane, in order to solve the problem of waste of the resources of a control plane when the amount of data to be transmitted suddenly increases during a data transmission process using the control plane transmission mode, the company proposes that a NB-IOT user in a connection state can switch from the control plane transmission mode to the user plane transmission mode. The detailed process is illustrated in FIG. 2, including the following operations.

1. UE in a connection state sends and receives data by using the control plane transmission mode.

2. The UE triggers the establishment of a bearer of the user plane, and sends a NAS message indicating the switch to the user plane transmission mode to an evolved node B (eNodeB).

3. The eNodeB forwards the NAS message to a mobility management entity (MME). The MME establishes an S1-U bearer upon reception of the NAS message.

4. The MME sends a release access bearer request message to a serving gateway (SGW) in order to reduce disorder of downlink data.

5. Upon reception of the release bearer request message, the SGW deletes the information related to the MME in a context of the UE, and returns a release access bearer response message.

6. The MME sends an initial context setup request message to the eNodeB to request to establish the S1-U bearer and the DRB.

7. The eNodeB sends a radio resource control connection reconfiguration message (RRC Connection Reconfiguration) to the UE to request to establish a radio bearer, and the UE returns an RRC connection reconfiguration complete message. By now, an uplink channel is established.

8. After the uplink channel is established, the UE may send uplink data to the eNodeB, and the eNodeB sends the uplink data to the SGW, and then the SGW sends the uplink data to a packet data network gateway (PGW).

9. The eNodeB sends an S1-AP protocol message to the MME: an initial context setup complete message.

10. The MME sends a modify bearer request message to the SGW to update an IP address of the eNodeB.

11. The SGW returns a modify bearer response message, and a downlink channel is established.

In the above process, the UE initiates a switch from the control plane transmission mode to the user plane transmission mode by sending the NAS message in the control plane transmission mode. When the UE enters an idle state after sending data in the control plane transmission mode, and it is predicted in the idle state that large data packets need to be sent next, in this case, when the above switch flow is used, the UE first needs to enter the connection state, and then initiates the above switch flow in the control plane transmission mode. Apparently, it will add some additional signaling overhead to a system.

SUMMARY

A method and a device for data transmission are provided according to embodiments of the present disclosure, which is used to switch from a control plane transmission mode to a user plane transmission mode and save signaling overhead of a system.

A method for data transmission is provided according to embodiments of the present disclosure, which includes the following operations.

It is determined whether to switch UE from a control plane transmission mode to a user plane transmission mode when the UE using a control plane transmission mode is in an idle state;

the UE switches to the user plane transmission mode to transmit data by initiating a service request flow to a network side, when it is determined to switch the UE form the control plane transmission mode to the user plane transmission mode.

In the above-described solution, the operation that it is determined whether to switch the UE from the control plane transmission mode to the user plane transmission mode when the UE using the control plane transmission mode is in the idle state includes the following acts.

A size of a data packet to be transmitted is determined when the UE using the control plane transmission mode is in the idle state; and it is determined whether to switch the UE from the control plane transmission mode to the user plane transmission mode according to the size of the data packet to be transmitted.

In the above-described solution, the operation that it is determined whether to switch the UE from the control plane transmission mode to the user plane transmission mode according to the size of the data packet to be transmitted includes the following act.

It is determined to switch the UE to the user plane transmission mode when the size of the data packet is greater than a set threshold.

In the above-described solution, the UE is a UE using an NB-IOT.

In the above-described solution, the operation that a service request flow is initiated to a network side includes the following act.

A service request message is sent to an eNodeB through RRC signaling.

In the above-described solution, the method further includes the following operation.

The UE deletes locally stored context information of a robust header compression (ROHC) related to the MME, and renegotiates the context information of ROHC with the eNodeB.

A method for data transmission is further provided according to the present disclosure, which includes the following operations.

An MME determines to switch UE using a control plane transmission mode to a user plane transmission mode when the UE is in an in idle state; and the MME deletes stored user context information which is invalid in the user plane transmission mode.

In the above-described solution, the operation that the MME determines to switch the UE using the control plane transmission mode to the user plane transmission mode when the UE is in an in idle state includes the following act.

The MME receives a service request message initiated in the idle state by the UE using the control plane transmission mode.

In the above-described solution, the user context information includes at least one of the following information: information related to an interface between the MME and an SGW or the context information of ROHC.

A device for data transmission is provided according to the present disclosure, which includes a determining module and a switching module.

The determining module is configured to determine whether to switch UE from a control transmission mode to a user plane transmission mode when the UE using the control plane transmission mode is in an idle state.

The switching module is configured to switch the UE from the control plane transmission mode to the user plane transmission mode to transmit data by initiating a service request flow to a network side, when it is determined to switch the UE from the control plane transmission mode to the user plane transmission mode.

In the above-described solution, the determining module is configured to determine a size of a data packet to be transmitted when the UE using the control plane transmission mode is in the idle state; and determine whether to switch the UE from the control plane transmission mode to the user plane transmission mode according to the size of the data packet to be transmitted.

In the above-described solution, the determining module is configured to determine to switch the UE from the control plane transmission mode to the user plane transmission mode when the size of the data packet is greater than a set threshold.

In the above-described solution, the UE is a UE using an NB-IOT.

In the above-described solution, the device further includes a context information processing module, configured to delete locally stored context information of an ROHC related to the MME, and renegotiate the context information of ROHC with the eNodeB.

A device for data transmission is provided according to the present disclosure, which includes a determining module and a deleting module.

The determining module is configured to determine whether to switch UE using a control plane transmission mode to a user plane transmission mode when the UE is in an in idle state.

The deleting module is configured to delete stored user context information which is invalid in the user plane transmission mode.

In the above-described solution, the user context information includes at least one of the following information: information related to an interface between the MME and an SGW or the context information of ROHC.

A computer storage medium is provided according to the present disclosure, which includes a set of instructions, which when being executed, causes at least one processor to perform the following operations.

It is determined whether to switch UE from a control plane transmission mode to a user plane transmission mode when the UE using a control plane transmission mode is in an idle state;

the UE switches to the user plane transmission mode to transmit data by initiating a Service Request flow to a network side, when it is determined to switch the UE from the control plane transmission mode to the user plane transmission mode.

A computer storage medium is provided according to the present disclosure, which includes a set of instructions, which when being executed, causes at least one processor to perform the following operations.

An MME determines to switch UE using a control plane transmission mode to a user plane transmission mode when the UE is in an in idle state; and the MME deletes stored user context information which is invalid in the user plane transmission mode.

In the embodiments of the present disclosure, when an NB-IOT UE using a control plane transmission mode enters an idle state, and it is predicted that large data packets need to be transmitted next, the user can directly switch to the user plane transmission mode in an idle state, thereby reducing a conversion of a data transmission flow, saving a signaling overhead of a system, and reducing packet loss and disorder.

DETAILED DESCRIPTION

When an NB-IOT user using a control plane transmission mode enters an idle state, and it is predicted that large data packets need to be transmitted next, it is no need to first enter a connection state and initiate a switch flow to a user plane transmission mode, the user can directly switches to the user plane transmission mode in the idle state, thereby reducing a conversion of a data transmission flow, saving a signaling overhead of a system, and reducing packet loss and disorder.

The embodiments of the present disclosure are further described in detail below with reference to the drawings of the description.

First Embodiment

The method for data transmission according to the present disclosure includes the following operations.

It is determined whether UE needs to switch from a control plane transmission mode to a user plane transmission mode when the UE using the control plane transmission mode is in an idle state;

the UE switches to the user plane transmission mode to transmit data by initiating a service request flow to a network side, when it is determined that the UE needs to switch to the user plane transmission mode.

Figure 1:
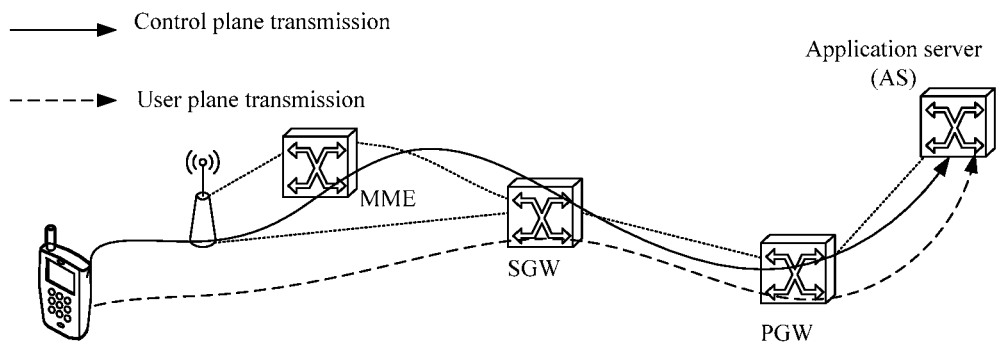
FIG. 1 is a schematic diagram of control plane transmission and user plane transmission in the prior art.
Figure 2:
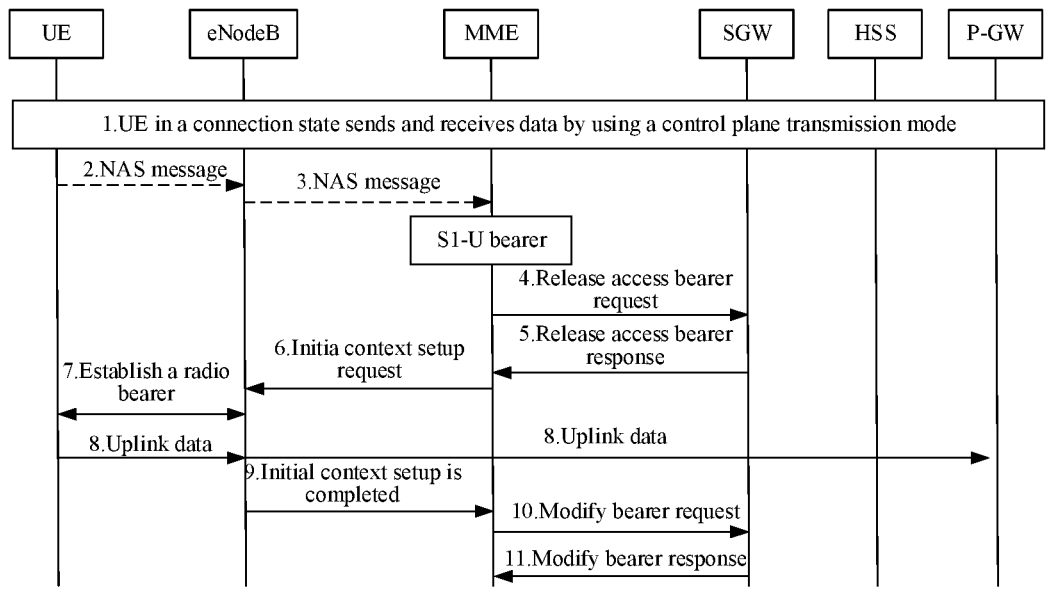
FIG. 2 is a schematic flowchart of a switch from a control plane transmission mode to a user plane transmission mode in the prior art.
Figure 3:
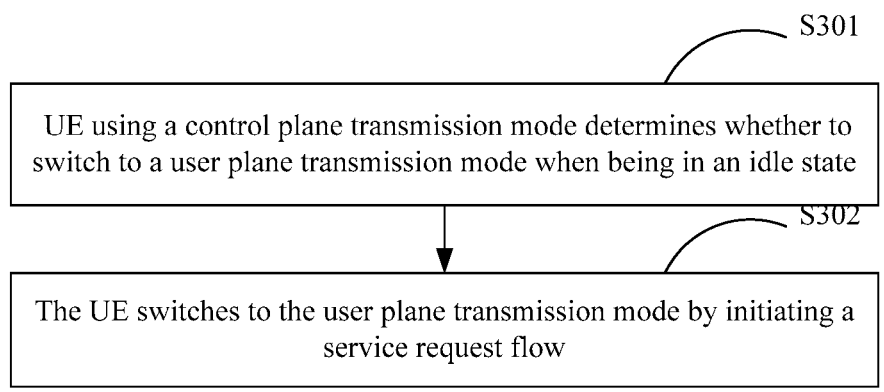
FIG. 3 is a flowchart of a method for data transmission according to a first embodiment of the present disclosure.

Specifically, as illustrated in FIG. 3, FIG. 3 is a flowchart of a method for data transmission according to the first embodiment of the present disclosure. The method includes the following operations.

At block S301, UE using a control plane transmission mode determines that the UE needs to switch to a user plane transmission mode when being in an idle state.

The UE in the embodiment of the present disclosure may refer to UE using the NB-IOT. In addition, the UE in the embodiment of the present disclosure supports the user plane transmission mode (or referred to as a user plane mode or a user plane optimization mode) in addition to the control plane transmission mode (or referred to as a control plane optimization mode).

Here, the operation that the UE using the control plane transmission mode determines whether the UE needs to switch from the control plane transmission mode to the user plane transmission mode when being in the idle state may include the following acts.

When the UE is in the idle state, a size of a data packet to be transmitted may be predicted, and the UE determines whether it needs to switch to the user plane transmission mode according to the size of the data packet to be transmitted. Specifically, when the size of the data packet to be transmitted is greater than a set threshold, the data packet may be considered as a large data packet, in this case, it is determined that the UE needs to switch to the user plane transmission mode.

At block S302, the UE switches to the user plane transmission mode by initiating a service request flow.

Specifically, the UE may send a service request message to the eNodeB by using an RRC signaling, where the service request message carries user identification information, and the user identification information may be a system architecture evolution (SAE)-temporary mobile subscriber identity (S-TMSI).

In some embodiments, the UE deletes the locally stored robust header compression (ROHC) context information related to the MME, and renegotiates the ROHC context information with the eNodeB.

In order to save air interface resources and reduce redundant transmission of IP header in air interfaces, an IP header compression function is generally used in data transmission. In the control plane transmission mode, the IP header compression function is implemented in the UE and the MME. The UE carries configuration parameters of the IP header compression when initiating an Attach request or a tracking area update (TAU) request. The configuration parameters include information required for establishing an ROHC channel, as well as context information related to IP header compression. The MME binds uplink and downlink ROHC channels in the Attach or TAU accept message sent to the UE, and further sends parameters of response to the establishment of the header compression context. In the user plane transmission mode, the IP header compression function is implemented in the UE and the eNodeB, and the negotiation and configuration of related parameters of the IP header compression are completed in the process of establishing or reconfiguring the RRC connection.

During switching from the control plane data transmission to the user plane data transmission, a network element implementing the IP header compression changes, the parameters related to the IP header compression in the MME and the UE are no longer valid. Therefore, when the user plane data transmission is performed, the IP header compression function will not be implemented, and redundant IP header information will be transmitted in the air interface, which wastes the air interface resources.

Therefore, in the embodiment of the present disclosure, after switching from the control plane data transmission to the user plane data transmission, the UE deletes the locally stored ROHC context information related to the MME, and renegotiates the ROHC context information with the eNodeB. Specifically, after establishing the RRC connection with the eNodeB, upon reception of a capability query request from the eNodeB, the UE may feed back a support capability of the UE to the eNodeB, where parameter information related to an ROHC capability of the UE is included. For details on the processing on the MME side, refer to the description of a second embodiment.

Second Embodiment

Figure 4:
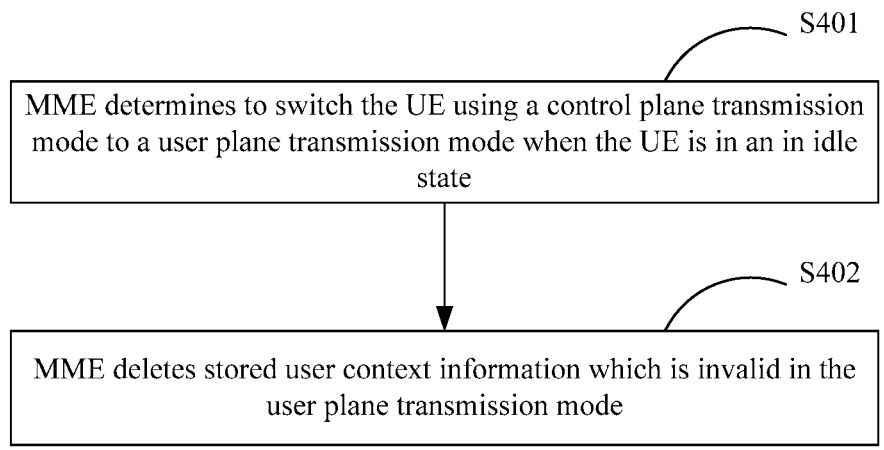
FIG. 4 is a flowchart of a method for data transmission according to a second embodiment of the present disclosure.

In the embodiment of the present disclosure, after initiating a switch from a control plane transmission mode to a user plane transmission mode by using the method of the first embodiment of the present disclosure, some user context information of the UE originally performing the control plane transmission in the MME will be invalid, and parameters related to IP header compression is included. Therefore, the MME needs to delete related information, as illustrated in flowchart FIG. 4.

At block S401, an MME determines that a UE using a control plane transmission mode needs to switch to a user plane transmission mode when the UE is in an in idle state.

At block S402, the MME deletes the stored user context information which is invalid in the user plane transmission mode.

In the specific implementation, the MME receives the service request message initiated by the UE using the control plane transmission mode in the idle state (the UE sends the RRC signaling carrying the service request message to the eNodeB, and the eNodeB sends a user initialization message carrying a NAS message (i.e., the service request message) to the MME). The MME determines whether the user context information that is invalid in the user plane transmission mode is stored. If it exists, the user context information is deleted, otherwise the operation is ended.

Here, the invalid user context information may include: information related to an S11-U interface between the MME and an SGW, such as a downlink tunnel endpoint identifier (TEID) involved in a control plane optimization mode (when the downlink data is cached in the MME rather than in the SGW), as well as an ROHC context.

A signaling flow of the present disclosure from the control plane transmission mode to the user plane transmission mode will be described in detail below in a third embodiment.

Third Embodiment

Figure 5:
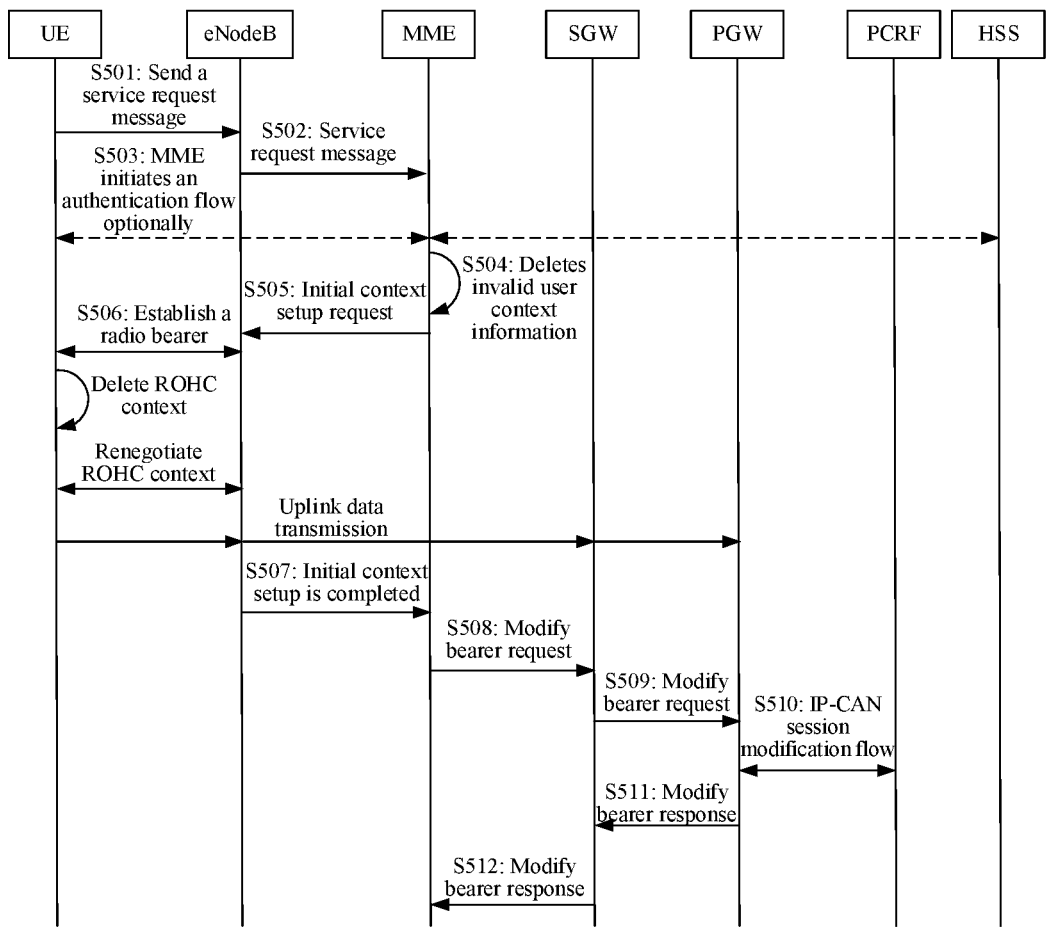
FIG. 5 is a flowchart of a method for data transmission in an NB-IOT according to a third embodiment of the present disclosure.

As illustrated in FIG. 5, FIG. 5 is a flowchart of a method for data transmission in a NB-IOT according to the third embodiment of the present disclosure. The method includes the following operations.

At block S501, when a UE using a control plane transmission mode in an idle state, and it is predicted that there are large data packets to be transmitted (a size of a data packet is greater than a set threshold), the UE initiates a service request flow. Specifically, the UE sends the service request message carried in an RRC message to an eNodeB, where an S-TMSI of the UE is carried.

At block S502, the eNodeB sends an initial UE message carrying the service request message (that is a NAS message).

At block S503, the MME may choose to initiate an authentication flow to a home subscriber server (HSS).

At block S504, the MME deletes the stored user context information invalid in the user plane transmission mode.

Here, the user context information of the UE in the control plane transmission mode includes information such as ROHC context information, information related to the S11-U interface such as a downlink TEID involved in the control plane optimization mode (when downlink data of the UE in the control plane transmission mode is cached in the MME, the MME does not delete the information related to the S11-U in the user context when the UE enters the idle state, the information will be invalid after the UE switches to the user plane transmission mode, therefore, the MME may delete the information to release a storage space).

At block S505, the MME sends an initial context setup request message to the eNodeB to request to establish an S1-U bearer and a DRB.

At block S506, the eNodeB sends an RRC connection reconfiguration message to the UE to request to establish a radio bearer, and the UE feeds back an RRC connection reconfiguration complete message.

By now, an uplink channel is established and the radio bearer is successfully established. The UE may send uplink data to the eNodeB, the eNodeB sends the uplink data to the SGW, and then the SGW sends the uplink data to a PDN gateway (PGW).

In addition, the UE may delete the locally stored ROHC context information related to the MME and renegotiate the ROHC context information with the eNodeB. Specifically, the UE may feed back a support capability of the UE to the eNodeB upon reception of the capability query request from the eNodeB, where the parameter information related to the ROHC capability of the UE is included.

At block S507, after the S1-U bearer and the DRB are established, the eNodeB sends an initial context setup complete message to the MME.

At block S508, the MME sends a modify bearer request message to the SGW to update an IP address of the eNodeB.

At block S509, when the radio access technology (RAT) or user-location-information (ULI) changes, the SGW sends a modify bearer request message to the PGW to update the RAT or ULI.

At block S510, when there is a dynamic policy and charging control (PCC) deployment, the PGW initiates an IP-connectivity access network (IP-CAN) session modification process to a policy and charging rules function (PCRF) entity.

At block S511, the PGW feeds back a modify bearer response message to the SGW.

At block S512, the SGW sends the modify bearer response message to the MME.

By now, a downlink channel is established.

Based on the same inventive concept, a device for data transmission corresponding to the method for data transmission is also provided in the embodiment of the present disclosure. Since the principle of solving the problem by the device is similar to the method for data transmission in the embodiment of the present disclosure, the implementation of the device may be seen that of the implementation of the method, the repetition will not be described.

Figure 6:
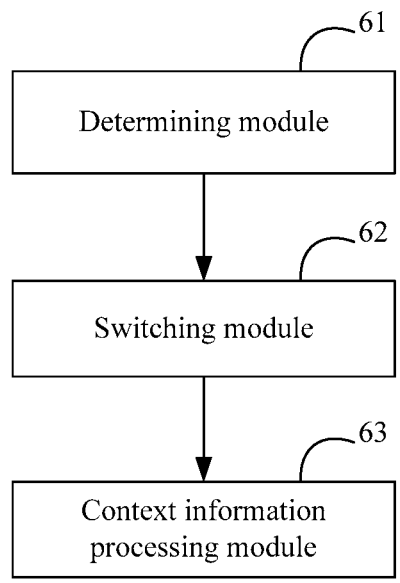
FIG. 6 is a schematic structural diagram of a device for data transmission according to an embodiment of the present disclosure.

As illustrated in FIG. 6, FIG. 6 is a schematic structural diagram of a device for data transmission according to an embodiment of the present disclosure. The device includes a determining module 61 and a switching module 62.

The determining module 61 is configured to determine whether a UE needs to switch from a control transmission mode to a user plane transmission mode when the UE using the control plane transmission mode is in an idle state.

The switching module 62 is configured to switch to the user plane transmission mode to transmit data by initiating a service request flow to a network side, when it is determined that the UE needs to switch to the user plane transmission mode.

In some embodiments, the determining module 61 may be configured to determine a size of a data packet to be transmitted when the UE is in the idle state; and determine whether the UE needs to switch to the user plane transmission mode according to the size of the data packet to be transmitted.

In some embodiments, the determining module 61 may be configured to determine that the UE needs to switch to the user plane transmission mode when the size of the data packet is greater than a set threshold.

In some embodiments, the UE may be a UE using an NB-IOT.

In some embodiments, the switching module 62 may be configured to send a service request message to the eNodeB by using an RRC signaling, where the service request message carries user identification information.

In some embodiments, the device may further include a context information processing module 63, configured to delete locally stored context information of an ROHC related to the MME, and renegotiate the context information of ROHC with the eNodeB.

Figure 7:
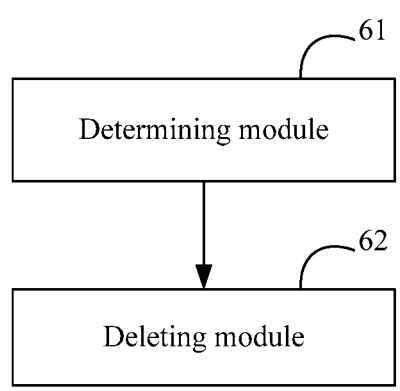
FIG. 7 is a schematic structural diagram of a device for data transmission according to another embodiment of the present disclosure.

As illustrated in FIG. 7, FIG. 7 is a schematic structure diagram of a device for data transmission according to another embodiment of the present disclosure. The device includes a determining module 71 and a deleting module 72.

The determining module 71 is configured to determine that a UE using a control plane transmission mode needs to switch to a user plane transmission mode when the UE is in an in idle state.

The deleting module 72 is configured to delete the stored user context information which is invalid in the user plane transmission mode.

In some embodiments, the determining module 71 may be configured to receive the service request message initiated by the UE using the control plane transmission mode in the idle state.

In some embodiments, the user context information may include at least one of the following information: information related to an interface between the MME and an SGW or the context information of ROHC.

A computer storage medium is provided according to the present disclosure, which includes a set of instructions, which when being executed, causes at least one processor to perform the method of the following operations.

It is determined whether a UE needs to switch from a control plane transmission mode to a user plane transmission mode when the UE using a control plane transmission mode is in an idle state;

the UE switches to the user plane transmission mode to transmit data by initiating a service request flow to a network side, when it is determined that the UE needs to switch to the user plane transmission mode.

A computer storage medium is provided according to the present disclosure, which includes a set of instructions, which when being executed, causes at least one processor to perform the method of the following operations.

An MME determines that a UE using a control plane transmission mode needs to switch to a user plane transmission mode when the UE is in an in idle state; and the MME deletes the stored user context information which is invalid in the user plane transmission mode.

It should be noted that the storage medium provided herein can perform all the processing procedures in the foregoing method embodiments, and details are not described herein.

It should be understood by those skilled in the art that, the embodiments of the present invention may be provided as a method, a system, or a computer program product. Therefore, the present invention may take the form of a hardware embodiment, a software embodiment, or a combination of software and hardware aspects. Moreover, the present invention may take the form of a computer program product embodied on one or more computer usable storage media (including but not limited to disk storage and optical storage, etc.) in which computer usable program code is embodied.

The present invention is described with reference to flowcharts and/or block diagrams of methods, device (systems), and computer program products according to embodiments of the present invention. It should be understood that each flow and/or block of the flowchart and/or block diagram, and a combination of a flow and/or a block in a flowchart and/or block diagram may be implemented by computer program instructions. These computer program instructions may be provided to a processor of a general purpose computer, a special purpose computer, an embedded processor, or other programmable data processing device to produce a machine for the execution of instructions, so as to produce an apparatus for implementing the functions specified in one or more flows of the flowchart or in one or more blocks of the flowchart by the instructions executed by a processor of a computer or other programmable data processing device.

The computer program instructions may also be stored in a computer readable memory that can direct a computer or other programmable data processing device to operate in a specific manner, such that the instructions stored in the computer readable memory produce an article of manufacture including the instruction device. The instruction apparatus implements the functions specified in one or more flows of the flowchart and/or one or more blocks of a block diagram.

These computer program instructions may also be loaded onto a computer or other programmable data processing device such that a series of operational steps are performed on a computer or other programmable device to produce computer-implemented processing for execution on a computer or other programmable device. Accordingly, the instructions executed on a computer or other programmable device provide operations for implementing the functions specified in one or more flows of a flowchart and/or one or more blocks of a block diagram.

Although the preferred embodiment of the present disclosure has been described, those skilled in the art can make additional modifications and variations to the embodiments once learning basic inventive concepts. Therefore, the appended claims are intended to be interpreted as including the preferred embodiments and all the modifications and variations falling within the scope of the present disclosure.

It will be apparent to those skilled in the art that various modifications and variations can be made in the present disclosure without departing from the spirit and scope of the present disclosure. Thus, it is intended that the present disclosure includes the modifications and variations if the modifications and variations falls within the scope of the claims of the present disclosure and equivalent technique thereof.

The invention claimed is:

1. A method for data transmission, comprising:
determining whether to switch user equipment (UE) from a control plane transmission mode to a user plane transmission mode when the UE using the control plane transmission mode is in an idle state, wherein determining whether to switch the UE from the control plane transmission mode to the user plane transmission mode when the UE using the control plane transmission mode is in the idle state comprises:
determining a size of a data packet to be transmitted when the UE using the control plane transmission mode is in the idle state; and
determining whether to switch the UE from the control plane transmission mode to the user plane transmission mode according to the size of the data packet to be transmitted;
switching the UE from the control plane transmission mode to the user plane transmission mode to transmit data by initiating a service request flow to a network side, when it is determined to switch the UE from the control plane transmission mode to the user plane transmission mode,
wherein initiating the service request flow to the network side comprises:

sending a service request message to an evolved node B (eNodeB) through radio resource control (RRC) signaling;

wherein deleting, by the UE, locally stored context information of robust header compression (ROHC) related to a mobility management entity (MME), and renegotiating the context information of ROHC with an eNodeB; and wherein the UE is UE using a narrow band internet of things (NB-IOT).

2. The method according to claim 1, wherein determining whether to switch the UE from the control plane transmission mode to the user plane transmission mode according to the size of the data packet to be transmitted comprises:

determining to switch the UE to the user plane transmission mode when the size of the data packet is greater than a set threshold.

3. The method according to claim 1, wherein the user context information comprises at least one of the following information: information related to an interface between the MME and a serving gateway (SGW) or context information of robust header compression (ROHC).

4. A device for data transmission, comprising a processor and a memory storing computer-readable operation instructions, wherein when the computer-readable operation instructions in the memory are run, the processor is configured to:

determine whether to switch user equipment (UE) from a control plane transmission mode to a user plane transmission mode when the UE using the control plane transmission mode is in an idle state, wherein the processor is specifically configured to: determine a size of a data packet to be transmitted when the UE using the control plane transmission mode is in the idle state; and determine whether to switch the UE from the control plane transmission mode to the user plane transmission mode according to the size of the data packet to be transmitted; and switch the UE from the control plane transmission mode to the user plane transmission mode to transmit data by initiating a service request flow to a network side, when it is determined to switch the UE from the control plane transmission mode to the user plane transmission mode, wherein the processor is specifically configured to send a service request message to an evolved node B (eNodeB) through radio resource control (RRC) signaling;

wherein the processor is further configured to: delete locally stored context information of robust header compression (ROHC) related to a mobility management entity (MME), and renegotiate the context information of ROHC with an eNodeB, and wherein the UE is UE using a narrow band internet of things (NB-IOT).

5. The device according to claim 4, wherein the processor is further configured to determine to switch the UE to the user plane transmission mode when the size of the data packet is greater than a set threshold.

* * * * *